United States Patent [19]

Ziolkowski et al.

[11] Patent Number: 4,476,550
[45] Date of Patent: Oct. 9, 1984

[54] DETERMINATION OF FAR FIELD SIGNATURES, FOR INSTANCE OF SEISMIC SOURCES

[75] Inventors: Antoni M. Ziolkowski, Twickenham, England; Paul L. Stoffa, Valley Cottage, N.Y.

[73] Assignee: The British National Oil Corporation, Great Britain

[21] Appl. No.: 296,178

[22] Filed: Aug. 25, 1981

[30] Foreign Application Priority Data

Aug. 29, 1980 [GB] United Kingdom ............... 8028018

[51] Int. Cl.³ .............................................. G01V 1/28
[52] U.S. Cl. ...................................... 367/21; 367/23; 367/59
[58] Field of Search ...................... 367/21-24, 367/59, 61, 62, 48; 181/110

[56] References Cited

U.S. PATENT DOCUMENTS

| | | | |
|---|---|---|---|
| 3,460,064 | 8/1969 | Giles et al. | 367/62 X |
| 3,786,408 | 1/1974 | Jenkinson et al. | 367/59 X |
| 4,353,121 | 10/1982 | Ray et al. | 367/48 X |

OTHER PUBLICATIONS

Brandsaeter et al., "A New High-Resolution or Deep Penetration Airgun Array", Geophysics, vol. 44, No. 5, May, 1979, pp. 865-879.
Ziolkowski et al., "Wavelet Deconvolution Using a Source Scaling Law", Geophysical Prospecting, vol. 28, 1980, pp. 872-901.
Ziolkowski, "High Resolution Seismic Reflection Developments in United Kingdom Coal Exploration", Proceedings Coal Seam Discontinuities Symposium, Nov. 3-4, 1976, Pittsburg, Penn., pp. 1-17.
Ziolkowski, "Source Array Scaling for Wavelet Deconvolution", Geophysical Prospecting, vol. 28, 1980, pp. 902-918.

Primary Examiner—Nelson Moskowitz
Assistant Examiner—K. R. Kaiser
Attorney, Agent, or Firm—Lerner, David, Littenberg, Krumholz & Mentlik

[57] ABSTRACT

A method is provided of ascertaining the far field signature of an array of sound source units, each of which is small compared with the wavelength of the highest frequency of interest. The units are fired so that the interactions between them is negligible. This is achieved by firing the units sequentially so that each generates all its significant radiation before the next is fired, and/or by firing more than one unit at a time and separating the units by at least one wavelength of the lowest frequency of interest. The far field signature of each unit is measured by a pressure-sensitive detector close to the unit but in a region where the phase spectrum of the pressure field is independent of azimuth and range. The far field signature of the array is derived from the measured signatures by summation.

8 Claims, 3 Drawing Figures

DETERMINATION OF FAR FIELD SIGNATURES, FOR INSTANCE OF SEISMIC SOURCES

BACKGROUND OF THE INVENTION

1. Field of the Invention

The present invention relates to the determination of the far field signature of, for instance, a marine seismic source.

In siesmic experiments, the measurable response x(t) is regarded as being composed of the impulse response of the earth g(t), convolved with the far field signature of a seismic source s(t), plus some noise n(t). thus $$x(t) = s(t) * g(t) + n(t), \quad (1)$$

where the asterisk * denotes convolution.

The object of initial data processing of the measurements is to recover the earth impulse response g(t) from the measurable quantity x(t) with as high a degree of fidelity as possible. In order to do this there are three basic requirements which must be met:

(1) The signal to noise ratio $$|s(t) * g(t)| / |n(t)|$$

must be large.

(2) The frequency bandwidth of the generated far-field signature s(t) must be broad.

(3) The shape of the far field signature s(t) must be known.

This means that both the amplitude and phase as a function of frequency must be known.

All these three requirements are met if the seismic source produces a high-energy, broad bandwidth signature of known shape. In attempting to meet the first two requirements at sea, with seismic source arrays, it is usually the case that the third requirement is not met.

Marine seismic sources currently in use are of two types; point sources and arrays. Point sources are those which have dimensions which are small compared with the wavelengths of seismic radiation which they generate. Arrays are sources which are not small compared with the wavelengths of seismic radiation which they generate.

Some marine point seismic sources, notably air guns, generate low seismic energy in a band of frequencies which is generally too narrow for normal requirements. However, arrays of such sources are built to overcome the limitations of the individual guns. These arrays employ a number of guns of different sizes. Each size of gun generates seismic energy predominantly in a different part of the seismic spectrum, although the spectra of the guns of different sizes do overlap somewhat. The array of guns is designed to produce enough energy over a broad enough range of frequencies to satisfy the first two requirements mentioned hereinbefore. In order to preserve the essential design aim that the seismic energy generated be in the desired bandwidth, the guns are combined in units which are spaced sufficiently far apart to be essentially independent of each other, each unit consisting of one or more guns fairly close together. The units are small compared with a wavelength and are therefore basically point sources, but the dimensions of the whole array are usually of the order of a wavelength or more within the seismic bandwidth, and the array is not a point source.

Within such dimensions the basic source units do not behave entirely independently. The pressure wave generated by each unit radiates in all directions and impinges on all the other units, thus modifying their behaviour. Consequently the far field seismic pressure wave produced by the array of source units is not exactly equal to the sum of the signature of the individual source units acting independently. The interaction effects between the source units are not well understood and, as yet, there is no theory to predict exactly what the distorting effect of the interactions between source units within a seismic source array will be.

In order to meet the third requirement mentioned hereinbefore, it is essential to determine the far field signature of the seismic source array. This measurement is fraught with difficulties, and it is these difficulties which it is desired to overcome.

The basic problems with the measurement of the far field signature of a marine seismic source array is that the water on the continental shelf is too shallow to permit the measurement to be made over the required bandwidth.

The minimum range $r_1$ at which a hydrophone can be placed below the array to measure the far field signature is derived in the Appendix 1 to the description of preferred embodiments given hereinafter and is:

$$r_1 = f D^2 / c \quad (2)$$

where D is the length of the array, f is the frequency and c is the velocity of sound in sea water. At ranges less than this there will be phase distortion at frequency f. Any constraints on the magnitude of $r_1$ become converted to simultaneous constraints on the high frequency fidelity of the measurement.

There is a risk of contamination of the measurement by the arrival of the sea floor reflection. This will affect all frequencies, especially the low frequencies, if it arrives too early. There must be sufficient depth of water below the far field hydrophone to avoid contamination.

If, for example, it is desired to measure the far field signature of a marine seismic source array of length 20 m, preserving frequencies up to 100 Hz, the high frequency constraint demands that the hydrophone be at least 30 m below the array. If most of the significant energy over the bandwidth of interest is generated within the first 200 ms, at least 150 m of water is required below the hydrophone to record the source signature properly. If the depth of the source array is 10 m, a total depth of water of 190 m is required. Most of the continental shelf which it is desired to explore is much shallower than this. It is therefore impossible to measure accurately the far signature of a typical array such as this. It will be necessry to suffer severe phase distortion at high frequencies, or sacrifice the tail of the signature to contamination by sea bottom reflections, or both.

2. Description of the Prior Art

This problem is well understood and there are two approaches which have been used to overcome it. The first is simply to take the array into deep water and to measure the far field signature there. This signature is then used in subsequent processing of data which are obtained using the same source array in shallow water. The second approach is to design the array such that the far field signature is as short as possible, so that very little processing of the data for removal of the signature is required. It is also often a good assumption, with this second approach, that the signature is minimum-phase and therefore it can be removed from the data if a good estimate of the power spectrum of the source signature can be obtained from the data. In practice, these two approaches are used together. That is, the source signature is designed to be short and the far field signature is measured in deep water before the array is used for production seismic surveying on the continental shelf.

One problem with the first approach is that it is usually very difficult to keep all the conditions constant. There are always small variations in, for example, the depth of the source array. This varies with the speed of the ship through the water, which is not the same as the speed of the ship over the sea floor, due to variations in currents. There are also variations in sea state, performance of individual guns, synchronization of the firing instants, air pressure delivered by the ship's compressors, etc. Also, individual guns stop working properly sometimes and it is not always worthwhile to stop the whole survey simply to repair one gun. Therefore surveying continues with a different source signature. For these reasons, the deep-water far field measurement of the source array is likely to differ from the signature generated by the array in normal use.

Another problem with the first approach is that there is no single far field signature. The array is directional; that is, the shape of the signature varies with the direction. This is caused by the finite size of the array and is further described in Appendix 1. Therefore any single far field measurement can determine the signature in only one direction. A whole set of measurements would be needed to obtain the full required directional response and, as surveying conditions change, this response also changes.

A problem with the second approach is that it is normally impossible to generate a signature which is short enough without relying very heavily on destructive interference of the tail-end energy radiated from individual guns. In other words, signal energy is directed sideways to make the downward-travelling wave short. This is an inefficient use of available energy and is expensive in ship-board compressors, etc. Furthermore these signatures are never short enough, and processing of the recorded data to compress the signature is usually regarded as essential to obtain the best results.

This processing depends on a reliable estimate of the signature being obtainable from the data. This estimate is made using statistical techniques. There is no way to determine whether the correct signature has been obtained. This is because the statistical techniques aim to solve one equation i.e. equation (1) with three unknowns. The correctness of the solution is as good as the statistical assumptions and these cannot be tested.

SUMMARY OF INVENTION

According to the invention, there is provided a method of ascertaining the far field signature of an array of sound source units in a fluid, comprising employing an array of sound source units each of which is small compared with the wavelength of sound generated by the unit, locating at least one sound pressure detector at a known distance from the units of the array which distance is small compared with the wavelength of sound generated by the units, but sufficiently large for the phase spectra of the pressure fields of the units to be independent of azimuth and range, locating each source unit at a known distance below the fluid surface and at a distance from the fluid floor sufficiently greater than the distance between the detector and the source unit for the reflection of the soundwave from the floor to be disregarded, generating from one sound source unit at a time a sound pressure wave with intervals between consecutive waves being greater than the time taken for the preceding wave to pass the detector substantially completely, and/or generating sound pressure waves from more than one sound source unit at a time provided that these units are never closer than one wavelength of the lowest frequency of significance, and deducing by summation of the individual source unit signature's detected by the detector or detectors the far field signature of the array.

It is further possible to provide a method of determining the impulse response of the earth, comprising employing an array of sound source units arranged as defined hereinbefore to obtain a measured response, and deconvolving that response from the far field signature of the array ascertained by the method defined hereinbefore to obtain the earth impulse response.

However, the invention is not limited to these methods or to seismic applications. Thus, other methods having seismic or other applications are also possible within the scope of the invention.

A typical marine seismic source array comprises a combination of source units, each of which is small compared with a wavelength. When all these source units are filed simultaneously, interactions occur between the units. The units are either fired sequentially, such that each unit generates all its significant seismic radiation before the next unit is fired, or they are arranged to be so far apart that interaction is negligible, or both. In all cases, interactions between units can be neglected. Furthermore, since the dimensions of the individual units are small compared with a wavelength, the units act like point sources. The advantage of this is that the far field signature of the individual source units can be measured with a pressure-sensitive detector placed very close to the unit, at a range r which is small compared with a wavelength. Appendix 2 shows that the far field pressure field of a point source extends from infinity to a short distance from the source, whereas the far field particle velocity and particle displacement fields extend from infinity to about a wavelength from the source. In marine work, it is pressure waves which are easy to measure and thus this feature of the radiation of a point source can be exploited to overcome the problem of measuring the far field of an array.

In accordance with the invention:

1. The array is split into source units which are small compared with a wavelength (of the highest frequency of interest).
2. These units are fired such that interactions between them are made negligible. This is achieved in two ways:
   (a) By separation in time. The units are fired sequentially such that each one generates all its significant seismic radiation before the next one is fired.
   (b) By separation in space. The distance between spatially-separated elements must be greater than about a wavelength (of the lowest frequency of interest) for interaction to be negligible between them when they are generating seismic energy simultaneously.
3. The far field signature of each source unit is measured with a pressure-sensitive detector which is placed close to the source unit but still in the region where the phase spectrum of the pressure field of the point source is independent of azimuth and range (see Appendix 2);

4. From these measurements, the far field signature of the whole array is derived in any required direction.

In this approach, separation in time can be used when separation in space is not possible. Normally the elements in a marine seismic source array are much too close together to be able to neglect interactions between them when they are fired together. However, if the separation in space were adequate, separation in time would not be necessary.

DESCRIPTION OF PREFERRED EMBODIMENTS

Figure 2:
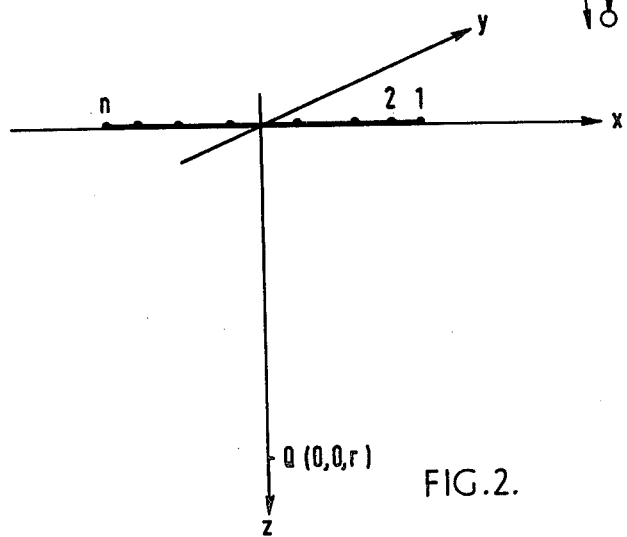
FIG. 2 is a diagram illustrating separation in time of sound source units of an array.

The idea of separation in time can probably best be appreciated by an example. Consider a line array lying in the x axis of a cartesian coordinate system, and let the centre of the array be defined by $x=0$, $y=0$, with the z axis pointing downwards into the earth as shown in FIG. 2. Let there be n source units in the array, and let the far-field signature of the ith source unit fired at time $t=0$ be $s_i(t)$, where it is assumed that the amplitude has been normalised to simulate measurement at a unit distance (say 1 m from the source. Now, because each source unit is a point source, its radiation has spherical symmetry and $s_i(t)$ is independent of azimuth. In the far field of the source, along the z-axis at a range r, the signature from the $i^{th}$ unit is:

$$(1/r)s_i(t-[r-1]/c) = (1/r)s_i(\tau) \quad (3)$$

where c is the speed of sound in water and $\tau$ is delayed time i.e. the time measured from the arrival of the onset of the wave at a range r.

The source units are fired sequentially, such that each one has generated all its significant seismic radiation before the next one is fired, and each source unit is arranged to be in the right location at the instant of firing. For example, if the units are fired at the same locations as in the line array described hereinbefore, and if the time delay between the firing of the $i^{th}$ and the $i+1^{th}$ unit is $t_{i+1}$, the far field signature at a range r along the z-axis will be:

$$\frac{1}{r} s(\tau) = \frac{1}{r} s_1(\tau - t_1) + \frac{1}{r} s_2(\tau - t_2) + \ldots + \frac{1}{r} s_n(\tau - t_n) \quad (4)$$

$$= \frac{1}{r} \sum_{i=1}^{n} s_i(\tau - t_i)$$

Proper selection of the firing times allows the effective power spectrum of the whole sequence of far field signatures to be arranged to be equal to the sum of the power spectra of the individual far field signatures if desired. The power spectrum of the far field signature may also be built up to any desired shape by an appropriate choice of source units and delay times.

There are two significant improvements in this approach over all previous approaches: (1) interaction between source units is eliminated, so that the far field signature of the array is equal to the sum of the individual signatures; and (2) the source signature of the array, including its amplitude and phase spectra, is known exactly from measurements which are made close to the source. In other words, all three requirements mentioned hereinbefore are satisfied.

Figure 3:
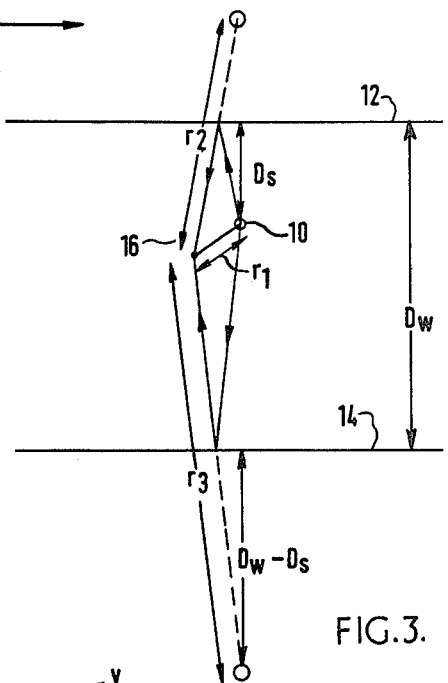
FIG. 3 is a diagram illustrating derivation of the far field signature of an array from measurements.

FIG. 3 shows a source unit 10 as a point source at a depth $D_s$ below the sea surface 12. The sea floor 14 is shown at a depth $D_w$ below the sea surface. At a small distance from the source unit i.e. much less than a wavelength away, the pressure wave generated by the source has spherical symmetry. The shape of the wave is constant, but its amplitude is a function of range (see Appendix 2). A detector hydrophone 16 shown in FIG. 3, which has an unidirectional response, will measure a direct wave from the source, a reflection from the sea surface which arrives a little later, and a reflection from the sea bottom. If the distances that these three waves travel are $r_1$, $r_2$ and $r_3$, and if the velocity of sound in water is c, the measured wave $m_i(t)$ will be related to the far field signature $s_i(t)$ in the following way:

$$m_i(t) = \frac{1}{r_1} s_i\left(t - \frac{r_1 - 1}{c}\right) - \frac{1}{r_2} s_i\left(t - \frac{r_2 - 1}{c}\right) + \frac{1}{r_3} s_i\left(t - \frac{r_3 - 1}{C}\right) \quad (5)$$

where it has been assumed that: $s_i(t)$ is the signature whose amplitude is normalised to a unit distance from the source; the reflection coefficient at the sea surface is $-1$; the reflection coefficient at the sea floor is $+1$ (the worst case).

In practice, $r_1$ can be made very small. In fact, as long as the source unit has a maximum dimension which is small compared with the shortest wavelength of interest, the hydrophone can be brought as close to the source as desired. (See Appendix 1). For typical marine seismic sources such as air guns, or water guns, $r_1$ can be as little as 1 m.

The second and third terms in equation (5) will be negligible if:

$$r_2/r_1 > 1 \quad (6)$$

and $$r_3/r_1 > 1 \quad (7)$$

For sources towed at normal operating depths, say less than 10 m, the inequality (7) will be satisfied if the total depth of water is about 20 m or more.

This is usually the case, and the third term in equation 5 may therefore be neglected. Thus:

$$m_i(t) = \frac{1}{r_1} \left( s_i(\tau) - \frac{r_1}{r_2} s_i(\tau - \tau_r) \right) \quad (8)$$

where $\tau = t - (r_i - 1)/c$, and $\tau_r = (r_2 - r_1)/c$. Equation (8) can be rewritten as:

$$m_i(t) = \frac{1}{r_1}\left(s_i(\tau) * \left[\delta(\tau) - \frac{r_1}{r_2}\delta(\tau - \tau_r)\right]\right) \quad (9)$$

where the asterisk * denotes convolution. Equation (9) describes the relation between the far field signature of the source $s_i(\tau)$ (without its sea surface reflection) and the measurement $m_i(t)$ made at a range $r_1$. If the geometry of the measurement is known, $s_i(\tau)$ can be derived from equation (9) exactly. It is therefore a fundamental requirement that the geometry defining $r_1$ and $r_2$ be known precisely enough to solve equation (9). A "filter" operator $h_{(t)}$ is defined as follows:

$$h(t) * \left\{\delta(t) - \frac{r_1}{r_2}\delta(t - \tau_r)\right\} = \delta(t) \quad (10)$$

Equation (10) may easily be solved by standard methods, and then this operator may be applied to equation (9) to yield:

$$m_i(t) * h(t) = \frac{1}{r_1} s_i(t) \quad (11)$$

In other words, $s(\tau)$ may easily be found from the measurement $m_i(t)$. If the inequality (6) applies, and the second term in equation (5) is negligible, it will not even be necessary to find the filter operator $h(t)$ and filter the measurement, for then equation (5) may simply be written as $$s_i(\tau) = r_1 m_i(t) \quad (12)$$

Therefore the only really important constraint on the method is to ensure that the water is deep enough for the third term in equation (5) to be negligible; and if the geometry is known $s_i(\tau)$ may be recovered to any desired accuracy.

Finally, n measurements like this must be made. For each measurement: (1) the source unit must be small compared with all the wavelengths of interest; (2) the third term in equation (5) must be negligible, as described above; and (3) the geometry must be known well enough to define $r_1$ and $r_2$. The time delays $t_1, t_2, t_3, \ldots t_n$, are selected to ensure that the generated signatures do not overlap. The far field signature $s(\tau)$ will then be as defined by equation (4).

For processing recorded data, equation (1) must be solved for the earth impulse response $g(t)$. In practice this cannot be done exactly, even if $s(t)$ is known exactly and the noise $n(t)$ is zero; round-off error in the computer will always introduce some noise. It is necessary to settle for something less precise than an exact answer.

In the presence of noise and with a precise, though imperfect, estimate of $s(t)$, it will be necessary to introduce some noise to stabilise the calculation.

The Fourier transform of equation (1) gives:

$$X(w) = S(w)G(w) + N(w) \quad (13)$$

where w is angular frequency. A reasonable estimate of $G(w)$ can be made by performing the following complex Fourier division with stabilisation:

$$G(w) = \frac{X(w) \cdot \overline{S(w)}}{|S(w)|^2 + |N(w)|^2}$$

where $\overline{S})/$ is the complex conjugate of $S(w)$. If no noise estimate is available, the stabilisation can be achieved by adding a small positive constant instead of the noise power term in the denominator of equation (14).

The invention is not limited to simulating existing arrays without interaction effects. For example, a very high energy broad bandwidth point source can be simulated by arranging for the spacing between source units to be such that each source unit is fired in the same geographic location. Alternatively, each individual source unit can be arranged to be at its optimum depth to generate the most amount of energy. As a further alternative, the source units can be arranged to be fired in locations which maximise the directivity of the array in some chosen azimuth. Each of these things may be done without conflicting with any of the simple requirements of the present invention.

A further development is to fire the sources in a continuous sequence:

$$1, 2, \ldots, n, 1, 2 \ldots, n, 1, \ldots$$

The time delays $t_1, t_2, \ldots t_n$ would all be non-zero and $t_1$ would be large enough to allow all the energy from the $n^{th}$ source unit to be generated before the sequence begins again. The power spectrum of the basic n-length sequence can be arranged to be essentially flat over the bandwidth of interest, simply by choosing an appropriate combination of source units. The recorded data can then be divided into time windows corresponding to integral members of the n-length sequence. This approach can be used to maximise the trade-off between horizontal and vertical resolution of the data. Furthermore, this continuous generation of sound energy allows existing equipment to deliver a much higher average output of seismic energy per unit time than could be done previously. This is because the known marine profiling technique demands that all the returning reflections be recorded before the next impulsive sound wave is generated.

Alternatively, for the same total energy input, there will be a much lower power output, because the energy is spread over a much longer time. This is a very important consideration for the future of seismic prospecting, as the number of effective survey vessels in an area is limited by the combined power level of the seismic sources. Some areas, including the North Sea, are approaching saturation point with the existing known systems.

Adequate energy and bandwidth can be achieved with the number of source units n less than 10. Typically n would be about 5 or 6 and the length of the sequence would be about 2.5 seconds. The energy may be increased without increasing the length of the sequence if additional sources were fired at the same time provided, of course, that they are adequately separated in space and provided the signatures are measured as described above.

APPENDIX 1

The Far Field of an Array

Figure 1:
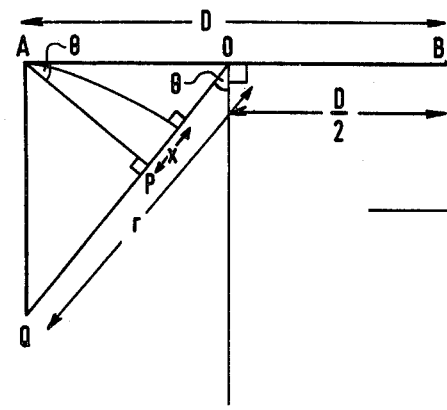
FIG. 1 is a diagram used to describe the far field of an array of sound source units.

Referring to FIG. 1 the travel path from the centre O of an array to the point Q is r, and the path from the end A of the array to Q is AQ. The phase difference caused by this difference in travel path s is given by:

$$2\pi \frac{(r - AQ)}{\lambda} = \left(\frac{D}{2}\sin\theta - x\right)\frac{2\pi}{\lambda} = \phi \quad \text{(A1)}$$

In the far field, as r tends to infinity, $\phi$ tends to $\pi(D\sin\theta)/\lambda$. The main beam of a uniform array AB is defined as the zone in the far field in which this phase difference is less than $\pi$. Thus:

$$\frac{\pi D \sin\theta}{\lambda} < \pi$$

or $$\sin\theta < \lambda/D \quad \text{(A2)}$$

If the dimension of the array D is large compared with a wavelength, $\theta$ is small. This means that small changes in $\theta$ are accompanied by large phase differences. The far field radiation of such an array is therefore a sensitive function of azimuth $\theta$.

At the other extreme, if D is small compared with $\lambda$, there are no significant phase differences as a function of azimuth $\theta$. The far field radiation therefore has spherical symmetry. Such a source is called a point source.

If the phase angle $\phi$ in equation (A1) differs from $\pi(D\sin\theta)/\lambda$ by a significant fraction of $2\pi$, then the point Q is in the near field. Let this 'significant fraction' be $\frac{1}{4}$. This defines x to be equal to $\lambda/4$ for Q to be in the near field.

By geometry:

$$AQ = r - \frac{D}{2}\sin\theta + \frac{\lambda}{4} \quad \text{(A3)}$$

and, applying Pythagoras's Therorem to the triangle APQ:

$$AQ^2 = \left(\frac{D}{2}\cos\theta\right)^2 + \left(r - \frac{D}{2}\sin\theta\right)^2 \quad \text{(A4)}$$

Squaring equation (A3) and subtracting it from equation (A4) yields:

$$O = \left(\frac{D}{2}\cos\theta\right)^2 - \frac{\lambda}{2}\left(r - \frac{D\sin\theta}{2}\right) - \frac{\lambda^2}{16} \quad \text{(A5)}$$

Three cases may be considered, namely:

Case 1: $D \gg \lambda$ This yields the result that Q is just in the near field if $$r = D^2/2\lambda$$

where the information that O is small has been used. The far field will be at rantes r greater than this and, approximately, $$r > D^2/\lambda$$

defines the far field of this array.

Case 2: $D \ll \lambda$ If $D = \lambda/4$, equation (A5) yields $r = O$. Therefore the near field of the directivity pattern is non-existent for sources which are much smaller than this.

Case 3: D is of the same order as $\lambda$ The special case where $D = \lambda$ is considered. This yields:

$$r = 3\lambda/8$$

for Q to be in the near field. Hence the far field begins at a range of r of the order of a wavelength $\lambda$ from the source if the dimension of the source is of the order of $\lambda$.

APPENDIX 2

The Near Field and Far Field of a Point Source

The radiation of a point source has spherical symmetry (see Appendix 1) At some small distance from a point seismic source in a homogeneous fluid, the radiation is described by the spherical wave equation:

$$\frac{\partial^2(rp)}{\partial r^2} = \frac{1}{c^2}\frac{\partial^2(rp)}{\partial t^2} \quad \text{(B1)}$$

in which p is pressure, r is radial distance from the source, t is time, and c is the speed of sound in the fluid and is equal to $\sqrt{k/\rho}$ where k is the bulk modulus $\rho$ is the density, It is assumed that there are only divergent outgoing waves and the possibility of convergent incoming waves is ignored. Equation (B1) then has a solution of the form:

$$p(r,t) = \frac{1}{r}g'\left(t - \frac{r}{c}\right) \quad \text{(B2)}$$

where g' is the time differential of some unknown function g. The particle acceleration $a_r$ is derivable from the pressure p from the equation $$a_r = \frac{-1}{\rho}\frac{p}{r} \quad \text{(B3)}$$

Substituting from p from equation (B2) into equation (B3) gives:

$$a(r,t) = \frac{1}{\rho c r}g''\left(t - \frac{r}{c}\right) + \frac{1}{\rho r^2}g'\left(t - \frac{r}{c}\right) \quad \text{(B4)}$$

The particle velocity $u_r$ can be found from the particle acceleration according to the relation:

$$u_r = \int a_r dt \quad \text{(B5)}$$

Applying this to equation (B4) gives $$u(r,t) = \frac{1}{\rho r^2}g\left(t - \frac{r}{c}\right) + \frac{1}{\rho c r}g'\left(t - \frac{r}{c}\right) \quad \text{(B6)}$$

Comparing equations (B2) and (B6), the expressions for the pressure function p(r,t), and the particle velocity functions u(r,t), the particle velocity function contains two terms, whereas the pressure function contains only one. The first term $(1/r^2)$ of the particle velocity function dominates at small distances r from the source. At very large distances r where the first term in the particle velocity function becomes negligible, there is a simple relationship between the pressure function and particle velocity function:

$$u(r,t) = \frac{1}{c} \cdot p(r,t) \quad (B7)$$

The region where this relation holds is known as the "far field" of the point source and in the far field the pressure and particle velocity are in phase with each other. In the near field they are not in phase.

If particle velocity were measured what would be the range r at which it would be necessary to place a device to measure the far field signature? It is necessary to first transform to the frequency domain. Delayed time is defined as:

$$\tau = t - r/c \quad (B8)$$

and the Fourier transform is defined by:

$$g(\tau) = \int_{-\infty}^{\infty} G(f)e^{2\pi i f \tau} df \quad (B9)$$

Differentiating equation (B9) with respect to $\tau$ yields $$g'(\tau) = \int_{-\infty}^{\infty} 2\pi i f G(f)e^{2\pi i f \tau} df \quad (B10)$$

Substituting for $g(\tau)$ and $g'(\tau)$ from equation (B9) and (B10) into equation (B6) gives $$u(r,t) = \frac{1}{\rho} \int_{-\infty}^{\infty} \left[ \frac{1}{r^2} + \frac{2\pi i f}{cr} \right] \cdot G(f)e^{2\pi i f \tau} df \quad (B11)$$

The two terms in the integral are of equal magnitude, but 90° out of phase with each other when:

$$r = \frac{c}{2\pi f} = \frac{\lambda}{2\pi} \quad (B12)$$

The far field region, in which the $1/r^2$ term is small is at distances $$r > \lambda$$

Thus, if particle velocity is measured, the measuring device must be located at distances greater than about a wavelength from a point source in order to measure the far field signature. However, if pressure is measured, it is immediately apparent from equation (B2) that the pressure sensitive device may be located anywhere within the linear elastic region, and will always measure a wave with the same shape.

We claim:

1. A method of ascertaining the far field signature of an array of sound source units in a fluid, comprising the steps of:
   (a) employing an array of sound source units, each of which is small compared with the wavelength of sound generated by the unit;
   (b) locating at least one sound pressure detector at a known distance from the units of the array, which distance is small compared with the wavelength of sound generated by the units but sufficiently large for the phase spectra of the pressure fields of the units to be independent of azimuth and range;
   (c) locating each source unit at a known distance below the fluid surface and at a distance from the fluid floor sufficiently greater than the distance between the detector and the source unit for the reflection of the soundwave from the floor to be disregarded;
   (d) generating from one sound source unit at a time a sound pressure wave with intervals between consecutive waves being greater than the time taken for the preceding wave to pass the detector substantially completely; and
   (e) deducing by summation of the individual source unit signatures detected by the at least one detector the far field signature of the array.

2. A method as set forth in claim 1, wherein the step (b) comprises locating a respective sound pressure detector at a known distance from each of the units of the array, which distance is small compared with the wavelength of sound generated by the unit but sufficiently large for the phase spectrum of the pressure field of the unit to be independent of azimuth and range.

3. A method as set forth in claim 2, wherein the array is moved with respect to the fluid floor and the step (d) further comprises actuating each sound source unit at the same position with respect to the fluid floor.

4. A method as set forth in claim 2, wherein the sequence of generation by the sound source unit is repeated periodically with intervals between consecutive sequences of waves being greater than the time for the last wave of the first sequence to pass the detector substantially completely.

5. A method of determining the impulse response of the earth, comprising the steps of:
   providing an array of marine seismic sources;
   ascertaining the far field signature of the array by means of a method as claimed in claim 1;
   employing the array to obtain a measured impulse response and
   deconvolving the measured impulse response from the far field signature of the array.

6. A method of ascertaining the far field signature of an array of sound source units in a fluid, comprising the steps of:
   (a) employing an array of sound source units, each of which is small compared with the wavelength of sound generated by the unit;
   (b) locating at least one sound pressure detector at a known distance from the units of the array, which distance is small compared with the wavelength of sound generated by the units but sufficiently large for the phase spectra of the pressure fields of the units to be independent of azimuth and range;
   (c) locating each source unit at a known distance below the fluid surface and at a distance from the fluid floor sufficiently greater than the distance between the detector and the source unit for the reflection of the soundwave from the floor to be disregarded;
   (d) generating sound pressure waves from more than one of the sound source units at a time which more than one units are located at least one wavelength of the lowest frequency of significance apart; and
   (e) deducing by summation of the individual source unit signatures detected by the at least one detector the far field signature of the array.

7. A method as set forth in claim 6, wherein the step (b) comprises locating a respective sound pressure detector at a known distance from each of the units of the array, which distance is small compared with the wavelength of sound generated by the unit but sufficiently large for the phase spectrum of the pressure field of the unit to be independent of azimuth and range.

8. A method of determing the impulse response of the earth comprising the steps of:

providing an array of marine seismic sources;

ascertaining the far field signature of the array by means of a method as claimed in claim 6;

employing the array to obtain a measured impulse response; and deconvolving the measured impulse response from the far field signature of the array.

* * * * *

UNITED STATES PATENT AND TRADEMARK OFFICE
CERTIFICATE OF CORRECTION

PATENT NO. : 4,476,550　　　　　Page 1 of 2
DATED : October 9, 1984
INVENTOR(S) : Antoni M. Zioklowski, et al.

It is certified that error appears in the above—identified patent and that said Letters Patent are hereby corrected as shown below:

Column 2:

Line 53, after "far" insert --field--;

Line 54, change "necessry" to --necessary--.

Column 6.:

Lines 50-55, change formulas (6) and (7) to read as follows:

$$\frac{r_2}{r_1} \gg 1 \qquad (6)$$

$$\frac{r_3}{r_1} \gg 1 \qquad (7)$$

UNITED STATES PATENT AND TRADEMARK OFFICE
CERTIFICATE OF CORRECTION

PATENT NO. : 4,476,550     Page 2 of 2
DATED : October 9, 1984
INVENTOR(S) : Antoni M. Zioklowski, et al.

It is certified that error appears in the above–identified patent and that said Letters Patent are hereby corrected as shown below:

Column 8:

Line 6, change "$\overline{S})/$" to $--\overline{S(w)}--$.

Signed and Sealed this

Twenty-first Day of May 1985

[SEAL]

Attest:

DONALD J. QUIGG

Attesting Officer     Acting Commissioner of Patents and Trademarks